UNITED STATES PATENT OFFICE.

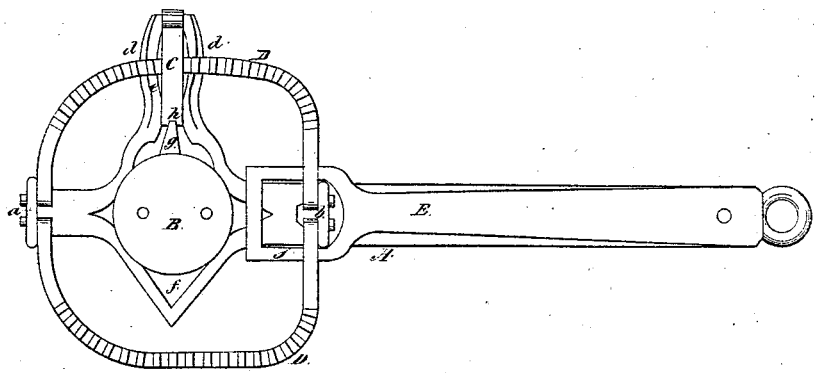
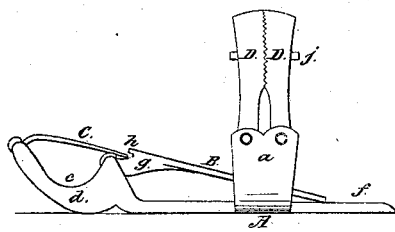
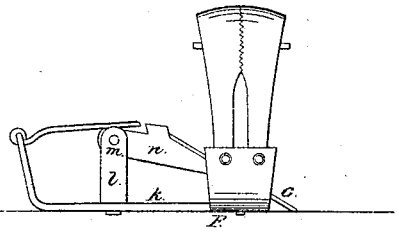
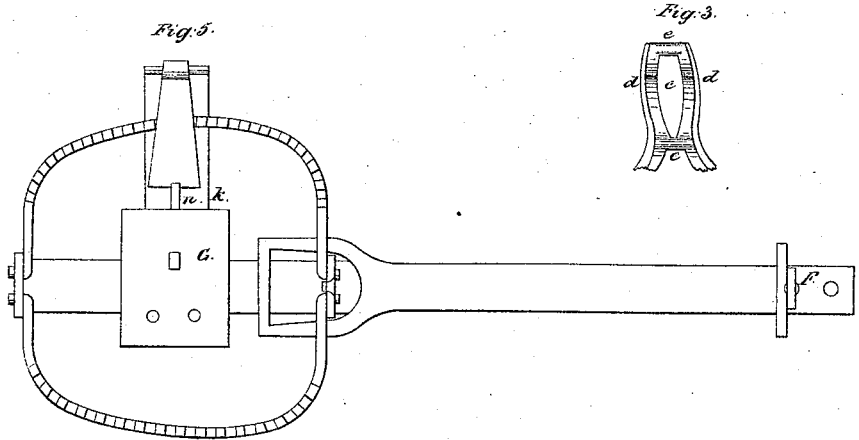
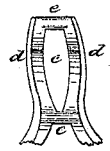

AMOS SHEPARD, OF PLANTSVILLE, CONNECTICUT.

IMPROVEMENT IN THE MANUFACTURE OF STEEL-TRAPS.

Specification forming part of Letters Patent No. 40,124, dated September 29, 1863.

*To all whom it may concern:*

Be it known that I, AMOS SHEPARD, of Plantsville, in the county of Hartford and State of Connecticut, have invented a new and useful Improvement in Steel-Traps; and I do hereby declare that the following is a full, clear, and exact description of the same, reference being had to the accompanying drawings, making a part of this specification, in which—

Figure 1 is a plan or top view of my invention; Fig. 2, an end view of the same; Fig. 3, a plan view of a portion of the same; Fig. 4, an end view of a steel-trap, as at present constructed; Fig. 5, a plan or top view of said trap.

Similar letters of reference indicate corresponding parts in the several figures.

This invention relates to an improvement in the construction of the cheap style of steel-traps, such as are manufactured of scrap-iron, and imported and sold at a very small cost. This style of steel traps cannot be made in the United States so as to compete in price with the imported ones, as the chief expense consists in the assembling of the parts or the securing of them together, and labor is so much cheaper abroad that the work here will exceed the cost of the foreign work combined with that of transportation and the commission on sales.

The object of this invention is to economize in the construction of the trap, and to this end I make the base-plate or base-bar of the trap of malleable cast-iron, and with said plate or bar I cast the journals or pivots of the bait-plate and pawl or catch of the bait-plate with the base-plate or base-bar, all in one piece, whereby the cost of manipulation in putting the parts of the trap together is very materially reduced, and still a trap more durable, and as good in every other respect as those hitherto made, is obtained.

To enable those skilled in the art to fully understand and construct my invention, I will proceed to describe it.

A represents a bar, which forms the bottom portion of the trap, and serves as a base for the same. This base has a vertical projection, $a$, at one end, and has another vertical projection, $b$, at some distance back from $a$. These two projections $a\ b$ are about of the same height. The bar A also has a projection, $c$, extending laterally from it. This projection is of open or skeleton form, as shown in Figs. 1 and 3, and is curved slightly upward, as shown in Fig. 2. This projection $c$ has its two parts or arms, $d\ d$, connected by cylindrical arms $e\ e$, which are shown in Fig. 3. The projection $c$ is about midway between the two vertical projections $a\ b$ and the bar A, projection $c$, and arms $e\ e$ are all cast in one piece. At the opposite side of the bar A, and in line with the projection $c$, there is a shorter lateral projection, $f$, which is of V shape and of skeleton form, as shown in Fig. 1.

B represents the bait-plate, which may be of circular form, and having a tang, $g$, projecting radially from it. This tang $g$ is formed or provided with a shoulder, $h$, as shown in Fig. 2, and is of sufficient length beyond the shoulder to admit of being bent around the inner arm $e$ of the projection $c$, as shown clearly in Fig. 3. C is a pawl or catch, which at its outer end is bent around the outer arm $e$, so as to work loosely thereon. The bait-plate B is made of malleable cast-iron, the tang being cast with it in one piece. The pawl or catch C may be made of wrought or malleable cast-iron, as desired.

D D are the two jaws of the trap, the ends of which are provided with journals $i$, the latter being fitted loosely in the upper parts of the vertical projections $a\ b$ of the bar A. E is the spring, the outer end of which is attached to the outer end of the bar A, and the inner end provided with a loop, $j$, which encompasses the two jaws D D. The spring and jaws are constructed in the usual way, and therefore do not require any particular description.

From the above description it will be seen that in putting the several parts of the trap together, all the manipulation required is to attach the spring E to the bar A, adjust the jaws D D in the vertical projections $a\ b$, and then attach the tang $g$ on the inner arm $e$, and also the pawl or catch C on the outer arm $e$. This may be very quickly done, and at a small expense.

The traps hitherto made are all composed of detached parts. A plate, $k$, is riveted to the base-plate F, (see Figs 4 and 5,) and an upright, $l$, is riveted to the plate $k$, in which a pivot, m, is fitted for the tang n of the bait-plate G to work on. The bait-plate G is even riveted to the tang n. The fitting together of so many detached parts is attended with considerable expense. It has been estimated at about thirty-seven cents per dozen traps, whereas by my invention the cost of assembling and fitting together of the parts will not exceed twelve cents. This diminution in the expense of construction will enable me to compete in the manufacture of these traps with those of the imported ones, while a superior article is obtained. The old style of trap is very liable to get out of order. Some of the parts will, even by fair usage, become detached in a short time.

Having thus described my invention, I claim as new, and desire to secure by Letters Patent, as an improved article of manufacture—

A steel-trap having its base-plate or base-bar A, projections c, and arms, journals, or pivots e e of the bait-plate B, and the pawl or catch C, all cast in one piece, and of malleable cast-iron, as herein specified.

AMOS SHEPARD.

Witnesses:
SIMEON H. NORTON,
H. S. PRATT.